Figure 1:
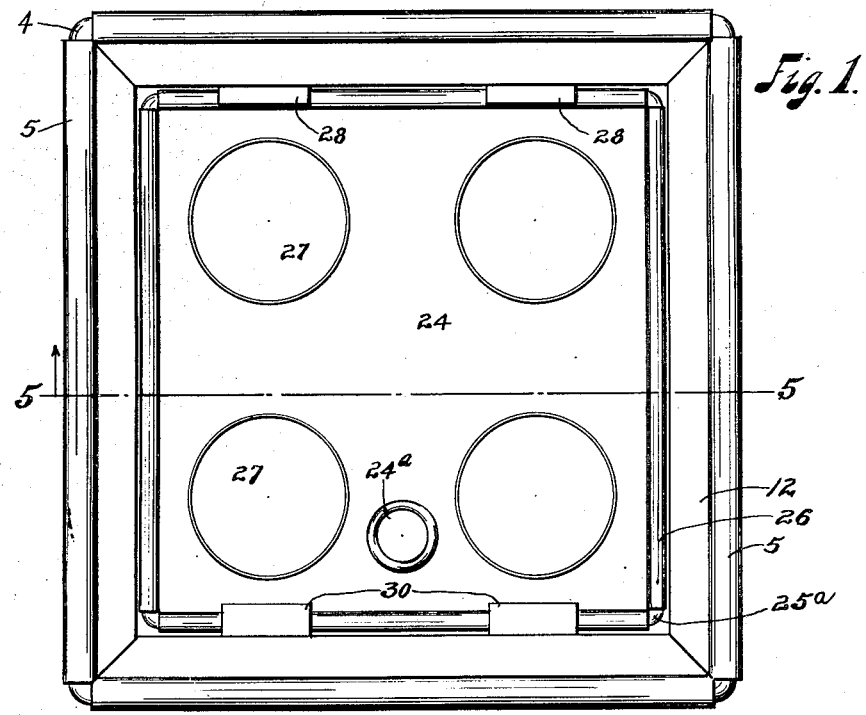

A. T. KRUSE.
PACKING CASE.
APPLICATION FILED MAY 27, 1907.

942,966. Patented Dec. 14, 1909.
6 SHEETS—SHEET 1.

Witnesses:
Edw. Ludwueller.
H. C. Wagner

Inventor:
Alfred T. Kruse
By Obed B. Billman
His Attorney.

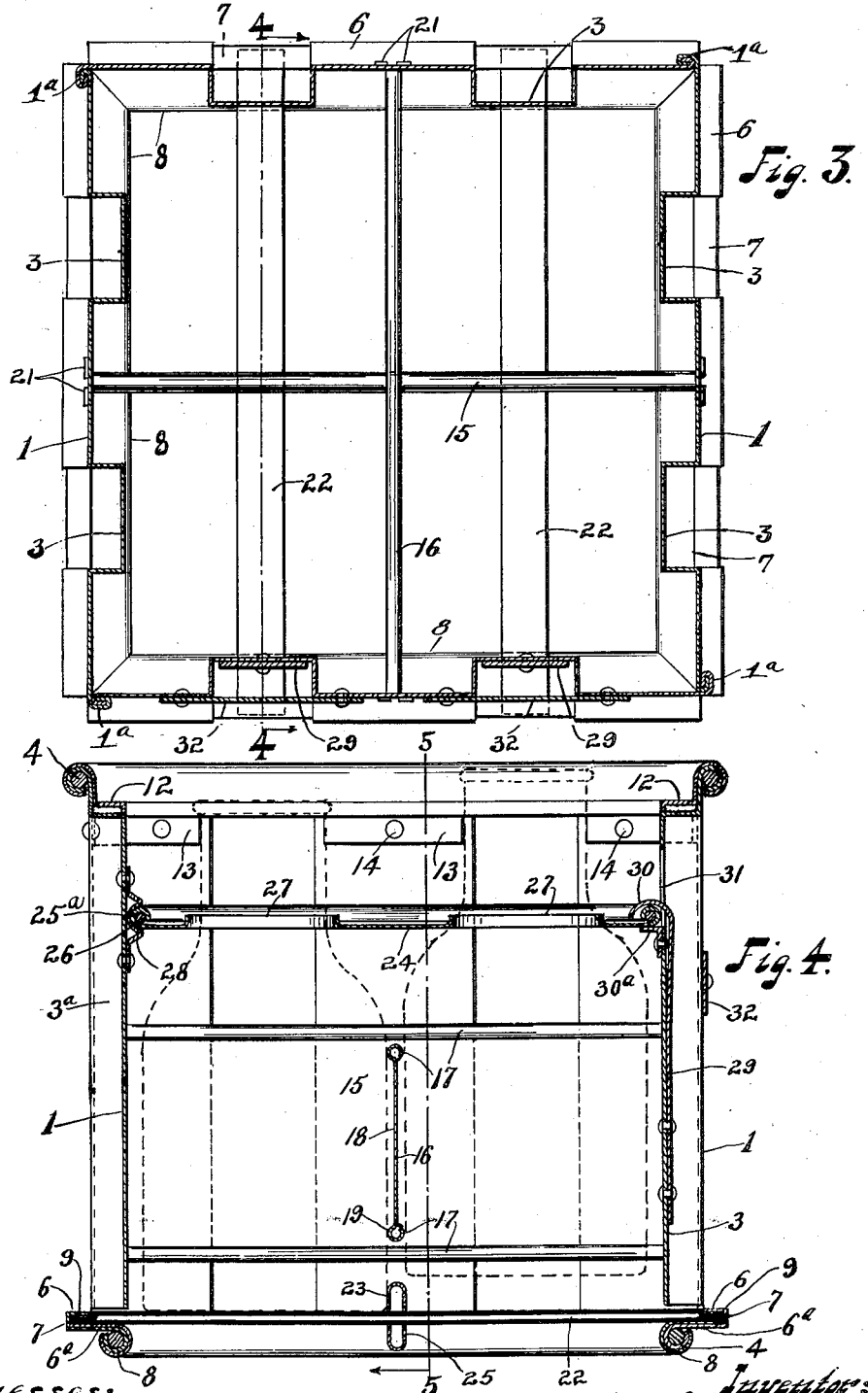

A. T. KRUSE.
PACKING CASE.
APPLICATION FILED MAY 27, 1907.
942,966.
Patented Dec. 14, 1909.
6 SHEETS—SHEET 3.
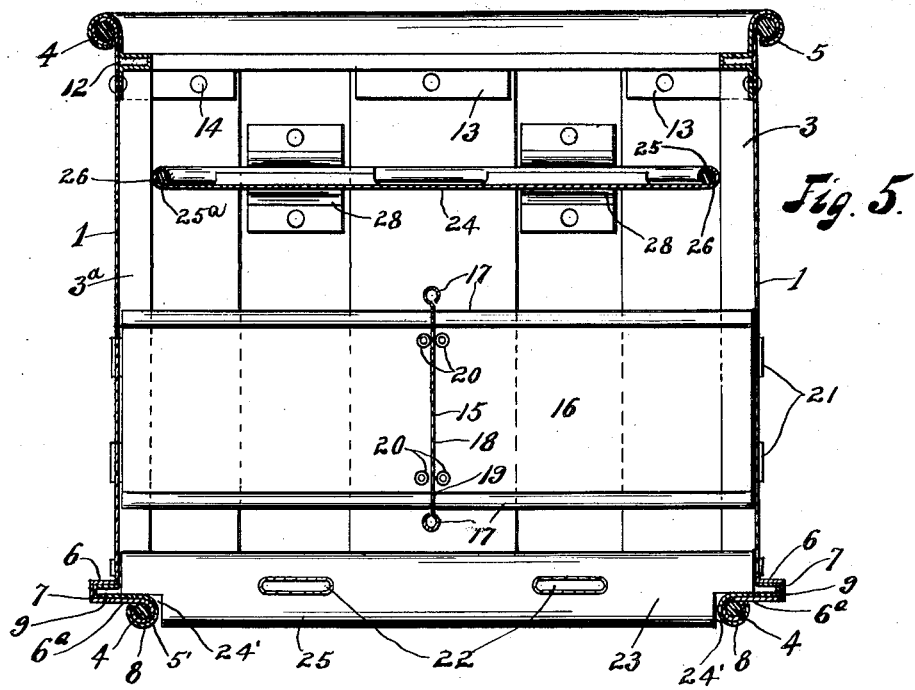
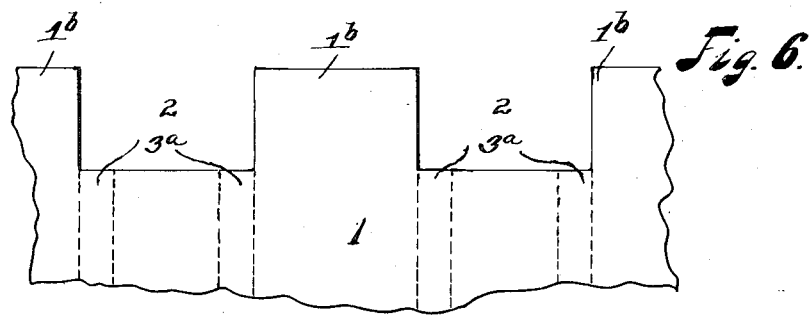
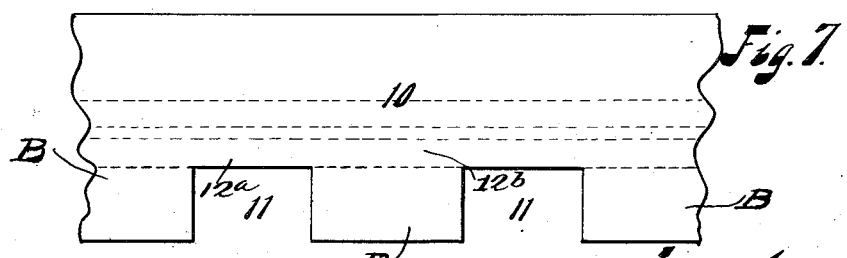
Witnesses:
Edw. Lindmueller.
F. C. Wagner.
Inventor:
Alfred T. Kruse
By Obed C. Billman
His Attorney.

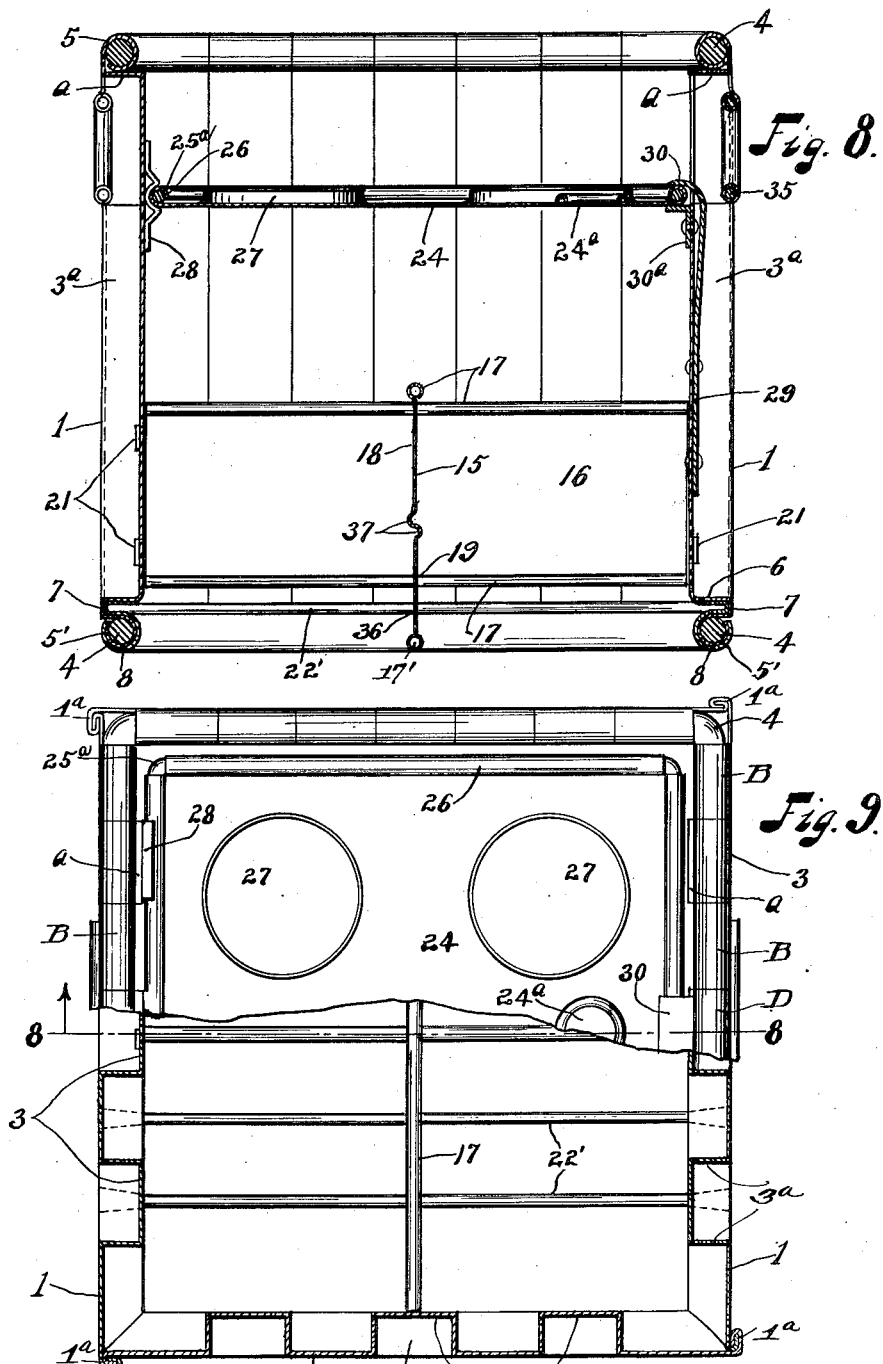

A. T. KRUSE.
PACKING CASE.
APPLICATION FILED MAY 27, 1907.
942,966.
Patented Dec. 14, 1909.
6 SHEETS—SHEET 5.
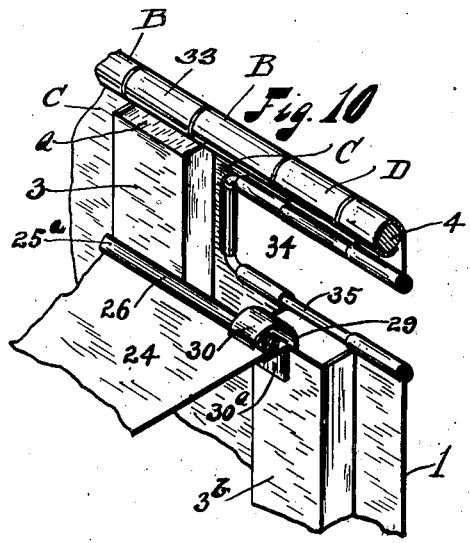
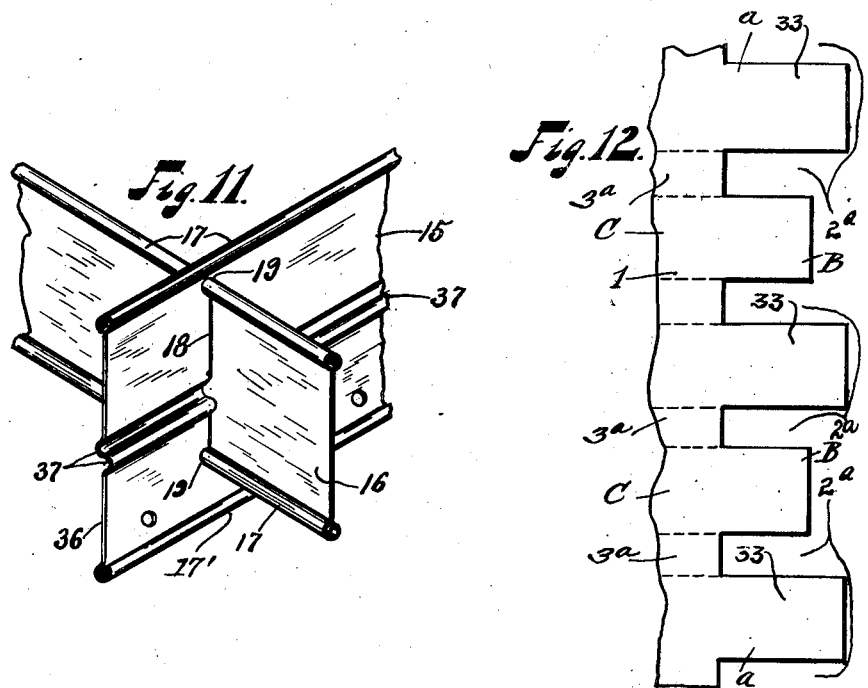
Witnesses:
Edw. Lindmueller.
F. C. Wagner.
Inventor:
Alfred T. Kruse
By Chas. C. Billman
His Attorney.

A. T. KRUSE.
PACKING CASE.
APPLICATION FILED MAY 27, 1907.

942,966.

Patented Dec. 14, 1909.
6 SHEETS—SHEET 6.

Witnesses:
Edw. Lindemuller.
Melva Sunehart.

Inventor:
Alfred T. Kruse
By Obed C. Billman
His Attorney.

UNITED STATES PATENT OFFICE.

ALFRED T. KRUSE, OF DEFIANCE, OHIO, ASSIGNOR TO THE AMERICAN STEEL PACKAGE COMPANY, OF DEFIANCE, OHIO, A CORPORATION OF OHIO.

PACKING-CASE.

942,966.  Specification of Letters Patent.  Patented Dec. 14, 1909.

Application filed May 27, 1907. Serial No. 375,776.

*To all whom it may concern:*

Be it known that I, ALFRED T. KRUSE, a citizen of the United States, residing at Defiance, in the county of Defiance and State of Ohio, have invented certain new and useful Improvements in Packing-Cases, of which the following is a specification.

My invention relates to improvements in packing-cases designed, primarily, for the transportation and storage of liquids contained in bottles and similar vessels.

The invention relates more particularly to that type or class known as "open bottom" cases, and the present embodiment of the invention is designed with special reference for use as a milk-case in connection with milk-bottle washing and filling machines, the bottles being securely retained in the bottle cells so that the case may be inverted for washing or cleaning purposes by means of a movable bottle-retainer-plate adapted to fit within the upper portion of the case and provided with a plurality of neck-receiving-openings designed to take over the necks of the bottles and impinging against the inclined shoulder portions thereof. The system of handling bottled milk by the use of machines, as above referred to, is such that from the time the case of empty bottles is returned to the bottling plant until it is sent out with full bottles for market, the bottles do not leave the case, the bottles being thoroughly cleansed and filled by the machines adapted to handle the filled milk-bottle-case.

The bottle retaining means and attachments for "milk cases" herein shown and described but not claimed, are made the subject matter of a divisional application filed June 30, 1909, Serial No. 505,302, and the bottle cell and open bottom structure herein described and particularly shown in Figures 8, 9, and 11, of the drawings, but not claimed herein, is made the subject matter of a divisional application filed June 14, 1909, Serial No. 502,154.

The primary object of the invention is to provide a generally improved case for the purpose mentioned, made of sheet-metal, of great strength and durability, and which will be much better adapted to its intended purposes than any other device of the same class with which I am acquainted.

With these ends in view, the invention consists in the novel construction, arrangement and combination of parts, hereinafter described, illustrated in the accompanying drawings, and particularly pointed out in the appended claims.

Figure 2:
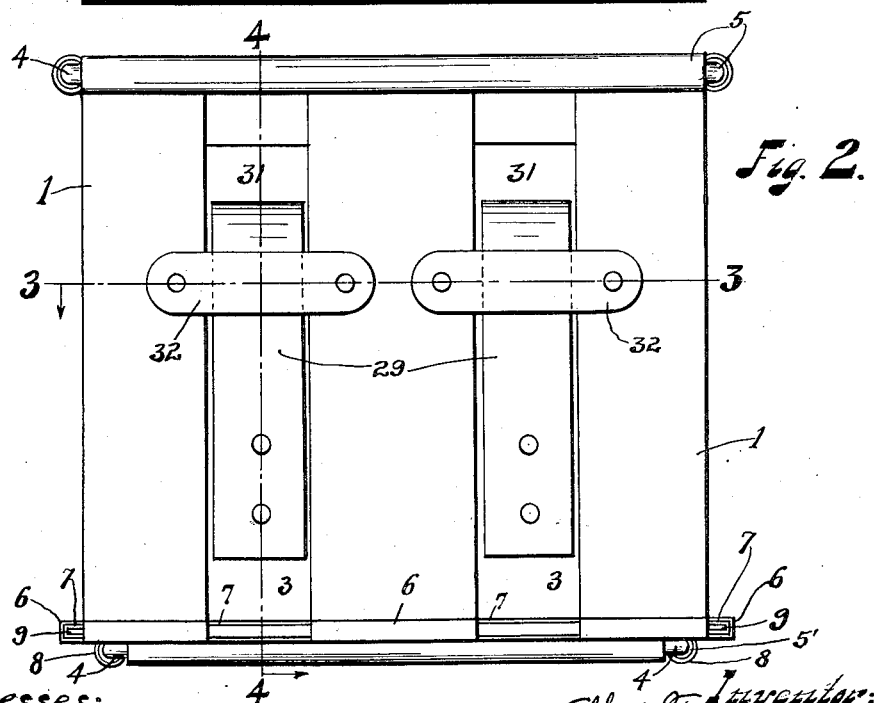
Figure 13:
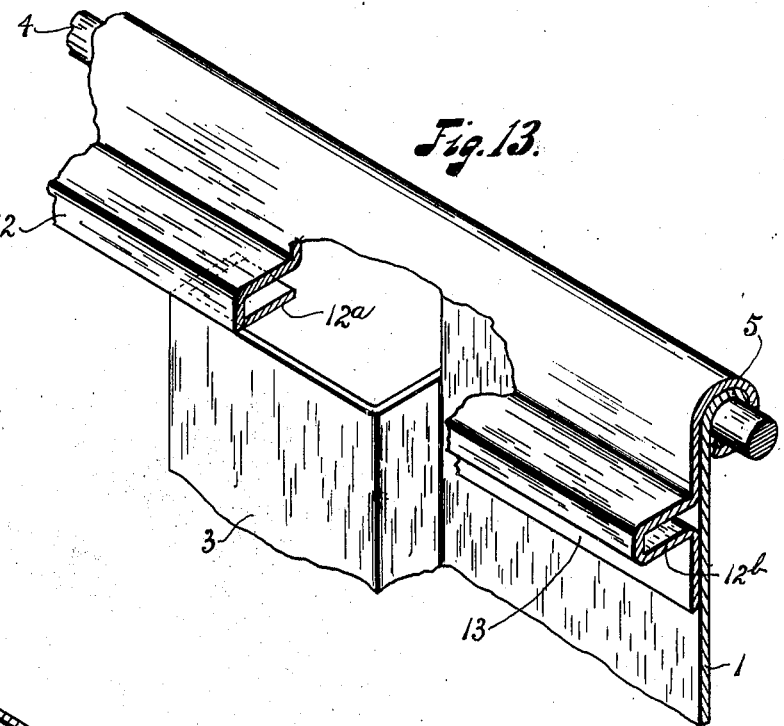
Figure 14:
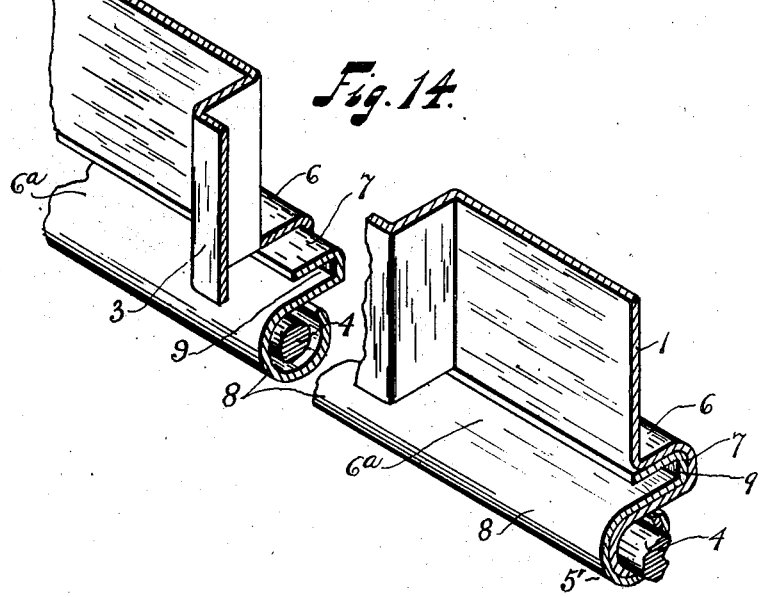

Referring to the drawings, forming a part of this specification, Fig. 1, is a top plan view of the improved case. Fig. 2, an end view of the same. Fig. 3, a horizontal sectional view taken through line 3,—3, of Fig. 2. Fig. 4, a vertical sectional view taken through line 4,—4, of Fig. 2. Fig. 5, a vertical sectional view taken through line 5,—5, of Fig. 1. Fig. 6, a plan view of a portion of one of the marginal edges of the sheet metal blank showing notched recesses, opposite where the panels are to be formed, preparatory to forming the blank into proper form for one of the walls of the case, the dotted lines indicating where the sides of the panels will be formed. Fig. 7, a view of a portion of the separate notched strip or blank of metal before being bent or crimped to form the second beading and horizontal inwardly-extending flange at the upper edges of the case. Fig. 8, a vertical sectional view of a modified form of the case taken through line 8,—8, of Fig. 9. Fig. 9, a view partly in top plan and partly in horizontal section. Fig. 10, a detail perspective view of the inner side of the handle portion and adjacent wall formations of the case shown in Figs. 8, and 9, illustrating relative positions of the retaining plate and the latching and engaging attachments thereof. Fig. 11, a detail perspective view of the improved main partition-plate and intersecting cross-partition-plate shown in Figs. 8, and 9. Fig. 12, a view of a portion of one of the notched marginal edges of the blank of metal before being formed into a case wall of proper paneled and beaded form as shown in Figs. 8, 9, and 10. Fig. 13, an enlarged detail perspective view of the upper marginal edge of the form of case shown in Figs. 1, to 7, inclusive. Fig. 14, a similar view of the lower marginal edge of same.

Similar characters of reference designate like parts throughout all the figures of the drawings.

The improved case comprises walls 1, suitably secured by means of an ordinary overlapping seam 1ª at their corners to form the case body, the latter preferably of rectangular form with side and end walls, and each of said walls is preferably made up of a single blank of sheet metal having its upper and lower marginal edges provided with a plurality of notched recesses as shown in Fig. 6, opposite where vertical panels 3, are to be formed, and said blank of sheet metal is then formed or crimped into a plurality of vertical panels 3, preferably inwardly extending as shown, with the upper and lower marginal edges comprising tongues $1^b$ and B, respectively, intermediate said notched recesses bent or curled over and about a wire 4, forming upper and lower beadings 5 and 5′. The lower portion of said walls, just above said lower beading 5′, is crimped or flanged to form an outwardly - extending horizontal bottom-supporting-flange 6, at the lower ends of said panels 3, and, preferably, forming a ledge $6^a$, within the plane of said walls. The flange 6, comprises an outwardly-extending upper horizontal member connected to a second or lower inwardly-extending member by a short vertical portion the lower member extending inwardly beyond the vertical plane of the side wall forming the ledge $6^a$, and a recess is formed between the upper and lower horizontal members into which is fitted a second or inner reinforcing strip of similar form as now described. A separate strip of metal is flanged or crimped horizontally to form a second horizontal flange 7, mounted within the flange 6, of each wall and curled over and about the lower beading 5′, as a second beading 8, forming a double-walled bottom-supporting-flange providing an inner recess 9, and a double walled lower friction-bearing-beading about the lower edges of the case. As a means of further strengthening the upper edges of the case, separate strips or blanks of metal 10, are provided with notched recesses 11, in their lower marginal edges, as shown most clearly in Fig. 7, and bent or flanged horizontally as indicated in the horizontal dotted lines in said Fig. 7, the material below the upper dotted line forming an inwardly-extending flange 12, depending within the upper edges of the case and, preferably, abutting against the upper ends of the panels as shown and the material above said upper dotted line forms a short vertical inner or second wall portion and is then bent or curled about the upper beading 5, forming a second or double beading about the upper edges of the case. It will be seen the material forming the lower member $12^a$ of the flange 12, and intermediate the recesses 11, abuts against the upper ends of the panels forming a covering for the upper panel openings, while the portions $12^b$ terminate in vertical tongues or attaching flanges 13. The recesses 11, are adapted to receive the upper ends of the panels and the depending intermediate portions or attaching flanges 13, are, preferably secured to the sides of the case by means of rivets 14, as shown in Figs. 4 and 5, of the drawings.

A plurality of bottle-cells are formed in the case, in the present instance, by means of a main partition-plate 15, intersected by an auxiliary or cross-partition-plate 16, said plates 15, and 16, having their edges curled over forming upper and lower beadings 17, adapted to abut or impinge against the bodies of the bottles. The auxiliary or cross-plate 16, intersects the main plate 15, by taking through a vertical slot 18, provided with terminal beading openings 19, adapted to receive the beadings of the intersecting cross-plate 16. The auxiliary or cross partition-plate 16, is secured in position relative to the main partition-plate by means of lock-studs 20, formed therein on each side of the main plate, and said partition plates are secured at their ends to the walls of the case in any suitable and convenient manner, but, preferably, by means of tongues 21, taking through vertical slots in the walls and bent over the outer sides thereof.

The open bottom comprises a plurality of bottle-supporting-bars 22, preferably of flat tubular shape (the longitudinal sectional walls of one of these bars being shown by heavy lines in Fig. 4) and having their ends taking into the inner recess 9, of the bottom-supporting-flange and, preferably, resting upon the ledge $6^a$, of the same. The bars 22, may be made in the form of flattened tubes formed of sheet metal strips as shown in Figs. 3, 4, and 5, or round bars or wires 22′, as shown in Figs. 8, and 9, and said bottle-supporting-bars 22 are adapted to be supported intermediate their ends by means of a main or cross supporting bar 23, preferably tubular and flattened vertically and having notched ends 24′, resting upon the ledge $6^a$, of the bottom-supporting-flange, and, preferably, having a depending portion 25, in the same plane or flush with the friction-bearing-beading about the lower edges of the case. The bars 22, intersect the supporting-bar 23, through suitable openings and, preferably, midway of their ends as shown, and the ends of the bars 23, are preferably secured to the walls of the case in a similar manner to that of the partition-plates 15, and 16.

As a means for retaining the bottles in proper position within the bottle-cells when the case is inverted, a bottle-retaining plate 24, is mounted within the case above the bottle-cells and comprises a plate of metal having its marginal edges curled over a wire $25^a$, forming a beading 26, and provided with a plurality of neck-receiving-openings 27, adapted to receive and take over the necks of the bottles arranged in the bottle-cells immediately beneath the edges of said openings 27, impinging against the inclined shoulders of the bottles when the case is inverted, and holding them in position shown in dotted lines of Fig. 4. The retaining-plate 24, is removably-secured within the case by having the beaded edge 26, of one of its sides take into a pair of pivot-lug-brackets 28, secured within one side of the case to the panels 3, and having its other or opposite beaded side engaged by means of a pair of spring-latch-bars 29, mounted, in the present instance, within the set-in portion of two adjacent panels 3, but upon the outer side of the case wall, as shown most clearly in Figs. 2, 3, and 4, of the drawings. The upper ends of the spring-latch-bars 29, terminate in inwardly-extending hooks 30, extending, in the present instance, through opening 31, of the set-in portion of the panels and taking over the adjacent beaded side of the retaining-plate 24. The spring-engaged side of the retaining-plate 24, rests in normal position upon brackets 30ª and is released by pressing the spring-latch-bars 29, outwardly until they clear the edge of the plate, after which the plate may be raised by means of the finger-openings 24ª, the opposite side of the beading 26, forming a pivot in the pivot-lug-brackets until the plate has been raised far enough to permit of the withdrawal of the pivoted side from its seat in the pivot-lug-brackets. The outward movement of the spring-latch-bars 29, as shown in Figs. 2, 3, and 4, is limited by means of stop-plates 32, extending over the panels containing the spring-latch-bars and secured to the side walls of the case.

In Figs. 8, 9, 10, 11 and 12, I have shown a modified form of case in which the inwardly-extending flange 12, in the upper portion of the case is dispensed with and the upper and lower marginal edges of the wall blank provided with a plurality of pairs of notched recesses 2ª, opposite where the sides 3ª of the panels 3, are to be formed, with intervening tongue portions 33, adapted to close the ends of the panels, as at *a* (see Figs. 8, 10 and 12) and the remaining portion of said tongues and the intervening marginal short tongues B of said wall blank bent or curled inwardly to form the upper beading 5, abutting against the upper ends of the panels. Fig. 12, shows short tongues B, and long tongues 33. The long tongues 33, serve to close the upper openings formed by the panels 3, and are then turned at right angles vertically upward to form beads around wire 4, while the short tongues B, are carried upwardly in line with the intervening portions C, between the panels as shown in Fig. 12, and then curled around wire 4. It will also be observed that oppositely-disposed beaded handle-openings 34, are formed and are intersected by vertical inwardly-extending panels 3ª, in one of which a spring-latch-bar 29, is mounted, the upper hook portion 30, extending directly in front of the handle opening and being adapted to be manipulated therethrough. The panel 3ᵇ, is of the same location as the other panels 3, only it is cut short below hand hole 34, and left open at its top for the passage of latch bar 29. It will also be observed in Fig. 10, that where the tongues 33, are cut off above hand holes 34, the beading is completed by filling in the spaces by separate pieces D curled about the wire 4. The lower portion of the handle-opening beading-wire or bar 35, acts as a stop-bar to limit the outward movement of the spring-latch bar 29, in lieu of the stop-plates 32.

In addition to strengthening the walls of the case, the panels 3, are adapted, by reason of their depth corresponding substantially with the thickness of the side walls of the wooden cases now used in connection with the bottle-washing-machines now in use, to form sheet metal walls of substantially the same inner and outer dimensions and having the same relative position to the adjacent parts. It will also be observed that the main partition-plate 15 is provided with an extension or depending portion 36, intersected by the bottle-supporting-bars 22, said depending portion 36, being used in lieu of the main or cross supporting bar 23, shown in Figs. 3, 4, and 5. The lower beaded edge 17' of said depending portion 36, being adapted to extend in the same plane or flush with the friction-bearing-beading about the lower edges of the case. Longitudinally-extending bottle-retaining-ribs 37, are formed in the main partition-plate 15, the two ribs being of substantially S-shape in cross-section and are adapted to impinge against the bodies of the bottles in the bottle-cells in lieu of the lower beading 17, positioned as shown in Figs. 4, and 5.

Having described my invention, without having attempted to set forth all the forms in which it may be made, or all the modes of its use, I declare that what I claim and desire to secure by Letters Patent is,—

1. A packing-case, comprising walls each formed of a single blank of metal having a plurality of recesses cut along its margins and crimped into a plurality of panels extending between said recesses, a beading formed by the upper edges of said walls, and a strip of metal curled over and about said beading forming a second or double beading and crimped to form a horizontal flange abutting against the ends of said panels.

2. In a packing-case, a wall formed of a single blank having a plurality of notched recesses along its marginal edges and formed into a plurality of panels intermediate said recesses with a beading along said marginal edges, said wall being provided along one of its marginal edges with a reinforcing strip bent therewith into a double walled outwardly-extending horizontal flange abutting against the ends of said panels and terminating in one of said beadings.

3. In a packing-case, a wall formed of a blank of metal having a plurality of notched recesses along its margins and provided with a plurality of inwardly-extending panels intermediate said notched recesses and a beading about the upper marginal edges of said wall, and a second beading carrying a depending horizontal flange abutting against the upper ends of said panels.

4. A packing-case, comprising walls each formed of a blank having a plurality of notched recesses along its margins and a plurality of inwardly-extending panels extending between said notched recesses with a beading at the upper edges of said walls, and reinforcing strips crimped with the lower marginal edges of said walls into outwardly-extending bottom-supporting flanges abutting against the lower ends of said panels.

5. In a packing case, a wall formed of a single blank having a plurality of notched recesses along its marginal edges and a plurality of panels intermediate said notched recesses, and a marginal reinforcing strip, crimped with the adjacent marginal edge into a horizontal flange abutting against the ends of said panels, said reinforcing strip terminating in a friction-bearing beading.

6. A packing-case, comprising walls provided with vertical panels and notched recesses in the upper and lower marginal edges thereof at the ends of said panels and an upper and a lower beading formed with said marginal edges, a horizontal supporting-flange formed in said walls above said lower beading, and a second horizontal supporting-flange and lower beading formed within and about said supporting-flange and beading, respectively, forming a double-walled supporting-flange and lower beading.

7. A packing-case, comprising walls provided with inwardly extending panels and having their upper marginal edges provided with notches at the ends of said panels and bent over and about a wire forming a beading, and a separate strip of metal mounted within said walls and curled about said wire forming a second or double beading and provided with a depending portion provided with a flange abutting against the upper ends of said panels.

8. A packing-case, consisting of walls each formed of a single blank of metal having a plurality of notched recesses along its margins, a plurality of panels formed intermediate said notched recesses, beadings at the upper and lower edges of said walls, a horizontal-bottom-supporting flange at the ends of said panels, and a second or reinforcing flange mounted within said flange and curled about said lower beading forming a double-walled bottom-supporting-flange and a double-walled lower friction-bearing-beading about the lower edges of the case.

9. In a packing-case, the combination with the walls thereof provided with a plurality of notched recesses and a beading at their upper marginal edges, and a plurality of panels formed intermediate said notched recesses; of strips of metal curled over said beading of each of said walls to form a double beading and bent to form a depending horizontal inwardly-extending flange within the upper edges of the case and abutting against the ends of said panels.

10. In a packing-case, the combination with the walls thereof provided with a beading at their upper edges and vertically arranged inwardly-extending panels formed in said walls; of separate strips of metal provided with marginal notched recesses to receive the upper ends of said panels and curled over said beading to form a second beading and crimped to form an inwardly-extending flange above the ends of said panels with depending attaching flanges intermediate said panels.

In testimony whereof I have affixed my signature, in presence of two witnesses.

ALFRED T. KRUSE.

Witnesses:
 CURTIS M. WILLOCK,
 MAY PARTEE.